Nov. 26, 1963　　W. J. ZIPPER　　3,111,930
TIRE PRESSURE INDICATOR
Filed April 4, 1960

*INVENTOR.*
WALTER J. ZIPPER
BY
ATTORNEYS.

ional structure that pressure applied downwardly on the pin 12, of sufficient intensity, will cause the valve 17, 18 to open and the air within the tire would then escape. The amount of this pressure required to be applied to pin 12 for opening the valve 17, 18 depends, of course, on the pressure within the tire itself. The lower the pressure in the tire, the lower is the required force to open the valve.

United States Patent Office 3,111,930
Patented Nov. 26, 1963

3,111,930
TIRE PRESSURE INDICATOR
Walter J. Zipper, % Nuid Engr. Corp., 3003 Pico Blvd., Santa Monica, Calif.
Filed Apr. 4, 1960, Ser. No. 19,925
8 Claims. (Cl. 116—34)

The present invention relates to a relatively inexpensive and simple device for attachment to the valve stem of an automobile tire for purposes of indicating the inflated condition of the tire.

Briefly, the device shown herein is adapted to be screwed onto the stem in lieu of the conventional valve cap and is practically of the same size as a conventional valve cap. One is semi-permanently maintained on each one of the valve stems of the four tires of the automobile to permit ready visual inspection of the inflated condition of the tire. Spring-biased means is incorporated in the device to automatically open the conventional Schrader-type valve incorporated in this stem whenever the pressure in the tire falls below a predetermined value. When this particular condition exists, the very small insignificant amount of air released from the tire inflates and deforms a flexible member which is visible through a transparent portion of the outer casing of the device.

It is therefore a general object of the present invention to provide a device of this general character.

A specific object of the present invention is to provide a pressure indicator for tires in which the main tire valve is opened only when an under-pressure condition exists.

Another specific object of the present invention is to provide a device of this character which may be made simply and inexpensively.

Another specific object of the present invention is to provide a device of this character featured by the fact that it is so constructed that it prevents a substantial loss of air from the tire itself to produce an indication, this result being obtained in large measure due to the fact that the main tire valve is not continuously maintained in an open position but the main valve is opened only when an under-pressure condition exists; and even under this circumstance effective means are provided to prevent loss of air.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
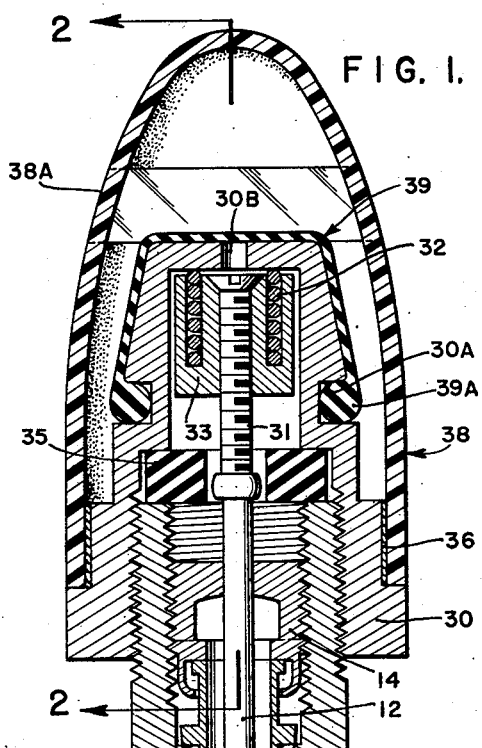
FIGURE 1 is a sectional view through a conventional tire stem having mounted thereon a device incorporating the present invention.

FIGURE 1 illustrates a conventional tire valve stem 10 having mounted therein a conventional Schrader-type valve insert 11. This insert 11 includes the conventional valve pin 12 slidably mounted in the externally-threaded core member 14. A gasket member 15 contacts a complementary tapered annular portion of the stem 10 to provide a seal when the insert member 14 is threaded into stem 10.

Mounted on the valve pin 12 is the valve closure member 17 which is normally urged by the pressure in the tire against the annular valve seat 18 defined by the lower peripheral edge of the insert member 14. This closure member 17 is partially contained by the cup-shaped member 20 which is biased upwardly in FIGURE 1 by a conventional type of spring 23 having one of its ends bearing against the cup-shaped member 20 and the other one of its ends bearing against the spring seat member 25 secured on the lower end of the pin 12.

It will be obvious from a description of this conventional structure that pressure applied downwardly on the pin 12, of sufficient intensity, will cause the valve 17, 18 to open and the air within the tire would then escape. The amount of this pressure required to be applied to pin 12 for opening the valve 17, 18 depends, of course, on the pressure within the tire itself. The lower the pressure in the tire, the lower is the required force to open the valve. The device of the instant invention comprises generally a shouldered and internally-threaded cylindrical member 30 with a pin 31 biased by means of coil compression spring 32 into engagement with the valve pin 12. The force exerted by this spring 32 is critical with respect to the operating pressure of the device; it is so established that at a predetermined low tire pressure the force of the spring 32 is sufficient to move the valve pin 12 downwardly and thus open the valve 17, 18.

Figure 2:
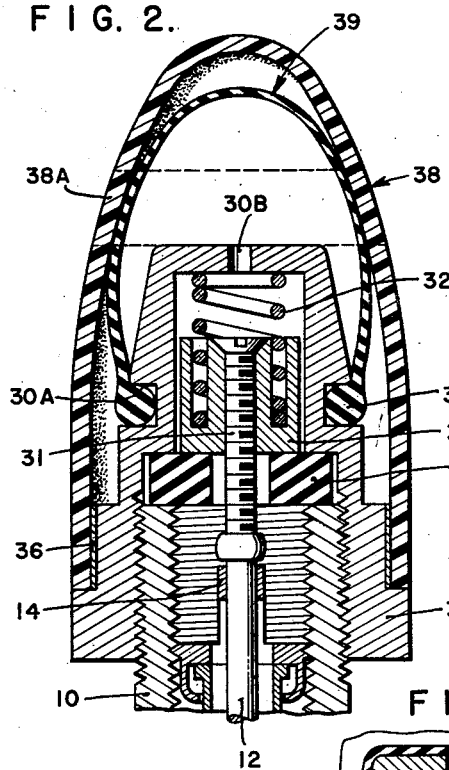
FIGURE 2 is a sectional view taken generally on the line 2—2 of FIGURE 1 and shows elements of the device in a different operating position.
Figure 3:
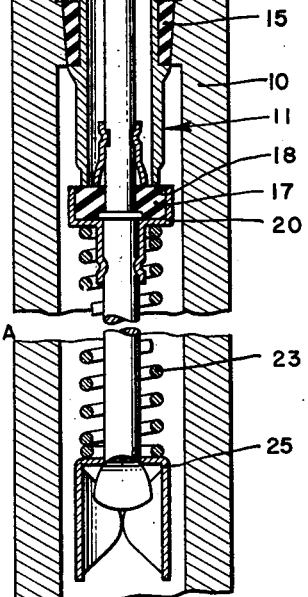
FIGURE 3 is a sectional view of the device similar to the sectional view in FIGURE 1 and serves to illustrate the manner in which the operating pressure of the device may be adjusted.
Figure 4:
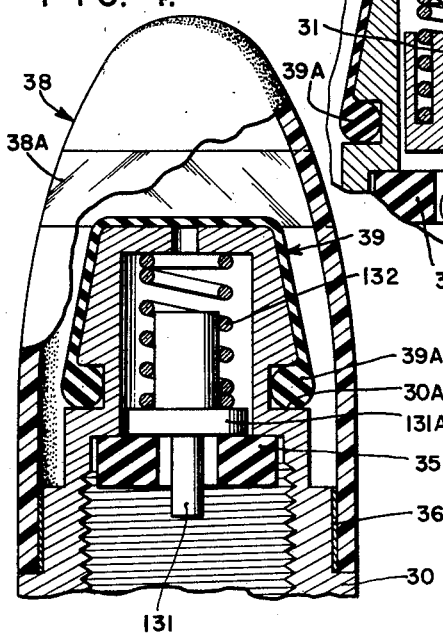
FIGURE 4 illustrates a modified device also embodying features of the present invention.

The spring 32 for this purpose may be a precalibrated spring as illustrated in FIGURE 4 or its "stiffness" or "strength" may be preset or adjusted using the adjustment mechanism incorporated in the device illustrated in FIGURES 1–3.

Thus, in FIGURES 1–3 the pin 31 comprises a screw-threaded element, i.e., a bolt, threaded in the grooved cylindrical member 33 which forms a seat for one end of spring 32, the other end of spring 32 bearing against an internal shouldered portion of the member 30 which is threaded on the stem 10 with the annular gasket 35 sandwiched between the upper end of stem 10 an an internal shouldered portion of the member 30.

Surrounding the member 30 and sealingly secured thereto by means of suitable cement 36, is a generally prolate formed casing or cover 38 of transparent plastic material to allow inspection of the condition of the flexible bulb-like diaphragm member 39.

This diaphragm member 39 has integrally formed therewith a heavy circular rim 39A which is suitably recessed in an annular externally grooved portion 30A of the member 30 so as to retain the same.

In operation of the device shown in FIGURE 1, when the pressure in the valve stem 10, i.e., within the tire, is greater than a predetermined pressure, the valve 17, 18 remains closed. However, when the pressure in the tire falls below such predetermined value, the force exerted by spring 32 is sufficient to move the valve pin 12 downwardly to open such valve 17, 18. When this latter condition exists, the air from the tire escapes and inflates and deforms the diaphragm member 39 to achieve, for example, the condition illustrated in FIGURE 2. The amount of deformation or inflation of the diaphragm member 39 may thus be used as an indication of the amount of tire under-pressure. For these purposes preferably the inside of the transparent cover 38 is painted with a light opaque paint or by other means to provide an annular window portion 38A having its lower marginal edge corresponding with the non-distorted condition of the diaphragm 39 as shown in FIGURE 1.

It will be seen that only a rather insignificant amount of air is required to produce this indication represented in FIGURE 2 and that there is no air leakage from the device itself, this being assured by the provision of the annular gasket 35 and the cemented connection of the shell 38 to the member 30 at 36. Some air may escape and fill the space between the diaphragm member 39 and the outer shell 38 but here again in view of the smallness of the device, the loss of air from the tire is insignificant.

In view of the above discussion it will be seen that in FIGURE 3 the bolt or actuating pin 31 is adjusted with respect to the seat 33 for spring 32 so that the condition indicated in FIGURE 2 is achieved at a lower tire pressure. As indicated above, the spring 32 may be a pre-calibrated spring or other means may be used to effect its adjustment or the operating pressure.

Thus, in FIGURE 4 the operating pin 131 (corresponding to the pin or bolt 31 in FIGURE 1) has a shouldered portion 131A serving as a seat for one end of the spring 132, the other end of the spring bearing against a shouldered portion of the member 30. Here again, a sealing gasket 35 is sandwiched between the upper end of the valve stem 10 and a shouldered portion of the member 30. In this case the shouldered portion 131A of pin 131 bears against the gasket 35 and thus gaskets 35 of different thickness may be used to adjust the force exerted by spring 132 and hence the operating pressure.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A pressure indicating device comprising a member adapted to be secured on a conventional tire stem having a valve pin for operation of a valve in said stem, an element movably mounted on said member and engageable with the end of said valve pin in said stem when said member is secured on said stem, spring means acting between said member and said element and effective to move said valve pin inwardly into said valve stem and to open said valve upon attainment of a pressure below a predetermined value in said stem, and inflatable means mounted on said member in communication with said valve stem, a shell sealingly mounted on said member which together with said shell provides an enclosure for said inflatable means, said shell having a transparent portion through which the condition of said inflatable means may be observed, said shell being contactable by said inflatable means to limit its movement, and sealing means for placement between said member and said stem.

2. A pressure indicating device for mounting on a conventional tire stem having a valve pin for operation of a valve in said stem comprising an internally threaded member mountable on said stem, an opening in said member, an inflatable element mounted on said member and surrounding a portion of said member with said opening providing an air passage for the flow of air into the space between said member and said element, an actuating pin, and spring means biasing said actuating pin with respect to said member and effective to move the last mentioned pin into engagement with said valve pin and to open said valve when the pressure in said stem falls below a predetermined minimum value, a shell sealingly mounted on said member and surrounding at least a portion of said inflatable element, said inflatable element being contactable with said shell whereby movement of said inflatable element is limited.

3. Pressure indicating apparatus for mounting on a conventional tire stem having a valve pin for operation of a valve in said stem comprising a generally cylindrical member having an internally threaded portion and a through opening therein, an inflatable element secured externally of said member with said opening providing an air passage for the flow of air between said member and said inflatable element, an actuating pin extending generally coaxially with said threaded portion, a spring seat secured to said actuating pin, and a spring acting between said seat and said member and effective to move said actuating pin into engagement with said valve pin and to open said valve when the pressure in said stem falls below a predetermined minimum value, and means carried on said member and limiting the movement of said inflatable element to prevent air leakage from said inflatable element.

4. Apparatus as set forth in claim 3 in which said seat is adjustable with respect to said actuating pin.

5. Apparatus set forth in claim 3 in which said seat forms an integral part of said pin.

6. Apparatus as set forth in claim 3 in which said member has an external annular grooved portion and said inflatable element has a relatively heavy ring maintained in said grooved portion.

7. Apparatus as set forth in claim 3 in which said limiting means comprises a transparent casing mounted on said member with a window portion through which a deformable part of said inflatable element may be viewed.

8. Pressure indicating apparatus comprising a generally cylindrical internally threaded member having a shouldered portion adjacent said threaded portion, gasket means engageable with said shouldered portion, an actuating pin extending generally coaxially of said threaded member, said pin having an annular flanged portion defining a spring seat, one end of said annular flange portion being engageable with said gasket, a coil compression spring having one of its ends bearing against a portion of said member and the other one of its ends bearing against the other side of said flanged portion, an inflatable element mounted on and externally of said member, said member having an external grooved portion, said inflatable element having an annular portion retained in said grooved portion, and a transparent casing encircling a portion of said member and said inflatable element for limiting movement of said element and sealingly secured to said member.

References Cited in the file of this patent
UNITED STATES PATENTS

| | | |
|---|---|---|
| 1,397,619 | Chard | Nov. 22, 1921 |
| 2,334,095 | Hoghaug | Nov. 9, 1943 |
| 2,417,449 | Rubin | Mar. 18, 1947 |
| 2,896,566 | Laurie et al. | July 28, 1959 |